G. BUTTERFIELD,
Assignor to D. ROBINSON, JR.
Shoe-Lacing Fastening.
No. 7,921. Reissued Oct. 23, 1877.
Fig. 2.
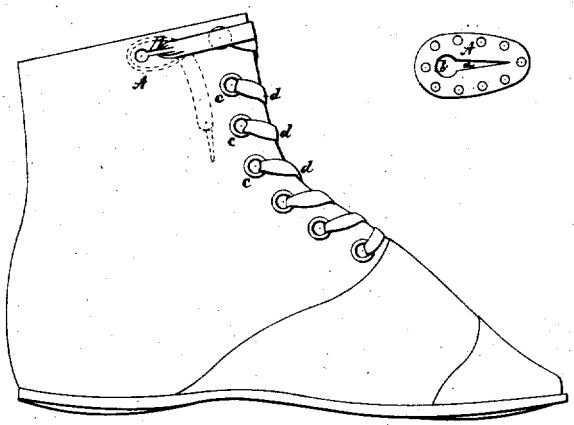
Fig. 1.
Fig. 3.
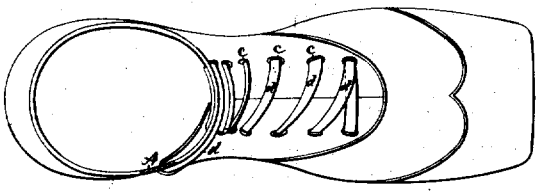
Witnesses.
E. C. Perkins.
W. J. Pratt.
Inventor.
David Robinson Jr
Assee Geo Butterfield
by Crosby & Gregory Attys
N. PETERS, PHOTO-LITHOGRAPHER, WASHINGTON, D. C.

UNITED STATES PATENT OFFICE.

DAVID ROBINSON, JR., OF BOSTON, MASSACHUSETTS, ASSIGNEE OF GEORGE BUTTERFIELD.

IMPROVEMENT IN SHOE-LACING FASTENINGS.

Specification forming part of Letters Patent No. 57,247, dated August 14, 1866; Reissue No. 7,921, dated October 23, 1877; application filed October 6, 1877.

*To all whom it may concern:*

Be it known that GEORGE BUTTERFIELD, a resident of Boston, in the county of Suffolk and State of Massachusetts, invented a new and useful Fastening for Gaiter-Shoes, or various other articles, of which the following is a specification:

Figure 1 denotes, in side elevation, a fastening or holding-plate embodying this invention. Fig. 2 is a side view, and Fig. 3 a top view, of a laced shoe having the improved fastening or holder applied thereto to illustrate an application of the invention.

A lacing caught in the fastening or holding-plate after having been run through a series of eyelet-holes of a shoe, corset, or other article, will be prevented from working loose in the eyelets.

The fastening or holder A, made of a thin plate of metal of elliptical or other suitable form, has an eye, *b*, from which extends a long slot, *a*, tapering to an angle or point, as seen in Fig. 1. The plate is provided with suitable openings, by which to attach the plate to the article which is to hold it.

In Figs. 2 and 3 the dotted lines indicate the application of the plate to a shoe, *c c* denoting the eyelet-holes, *d* the lacing.

The plate A is shown as inserted between the upper and lining, though it may, of course, be applied upon the outer or the inner surface of the shoe.

A hole, corresponding in shape with the slot, is cut through the upper and lining, in line with the slot.

The eye *b* is made of suitable size to allow the lacing to be passed freely through it, and from each eye the lacing is drawn into and toward the point or angle of the slot, where it becomes pinched by the opposite converging sides of the plate and is effectually held.

This invention consists, primarily, in the peculiar construction of the plate herein described, and also in its application to a shoe or other article to hold the lacing passed through the eye and into the slot.

The fibrous lacing of the shoe, after being passed through the eyelet-holes, is finally passed through the eye *b* of the plate, and is pulled firmly into the V-shaped slot, or toward the vertex of its angle. The friction of the plate at the sides of the slot acting upon the lacing will suffice to hold it firmly in position, and prevent it from becoming loose.

That portion of the lacing which may extend beyond the plate *b* and toward the interior of the shoe may be turned or tucked down into the shoe, or between it and the leg of the wearer.

With my invention there will be no necessity of tying the lacing in a knot at the top of the shoe.

I claim—

1. The metallic plate provided with an eye and with an angular conveying-slot extending therefrom, to operate substantially as described.

2. The combination with a series of lacing or eyelet holes *c*, of a plate A, having an eye and an angular slot leading therefrom, to secure the lacing *d*, substantially as shown and described.

In testimony whereof I have signed my name to this specification in the presence of two subscribing witnesses.

DAVID ROBINSON, JR.

Witnesses:
G. W. GREGORY,
W. J. PRATT.